Feb. 6, 1973   KIYOSHI KITAI   3,714,880
ELECTRIC SHUTTER OPERATING MECHANISM
Filed Sept. 24, 1971   3 Sheets-Sheet 3

United States Patent Office

3,714,880
Patented Feb. 6, 1973

3,714,880
ELECTRIC SHUTTER OPERATING MECHANISM
Kiyoshi Kitai, 54 Tomihisa-cho, Tokyo, Japan
Filed Sept. 24, 1971, Ser. No. 183,478
Claims priority, application Japan, Sept. 25, 1970, 45/83,484
Int. Cl. G03b 9/22
U.S. Cl. 95—63           9 Claims

ABSTRACT OF THE DISCLOSURE

A shutter operating mechanism comprises three rotary driving members. The first and second driving members are coaxial and are coupled by a first driving spring. The first driving member opens the shutter by movement in one direction from a cocked position and closes the shutter by further movement in the same direction. The third driving member is biased in a direction to close the shutter by a second driving spring and is held against such bias by the armature of an electromagnet when energized. The second and third driving members are coupled by modified gear teeth so that, in cocked condition the second driving member biased by the first driving spring acts on the third driving member to hold the armature against the unenergized electromagnet. At the end of the opening movement, the residue force of first driving member is dissipated by being directed from the second driving member to the third driving member in an approximately radial direction by the gear teeth. Upon release of the third driving member by the electromagnet, rotation of the third driving member by the second driving spring is transmitted through the gear teeth to the second driving member and hence to the spring-coupled first driving member to close the shutter.

---

The present invention relates to shutters and in particular to the opening and closing mechanism of electrically controlled shutters.

The shutter of a camera is operated by mechanism comprising a spring actuated driving member which is held in cocked position and is released to open and then close the shutter to make an exposure. In order to make a high speed exposure it is desirable for the driving member to close the shutter by further movement in the same direction as for opening the shutter so that the direction of movement of the driving member does not have to be reversed between the opening and closing. This avoids inertia effects which would retard shutter operation.

In an electrically controlled shutter, the shutter operating mechanism is held in open position by an electromagnet which, after a selected exposure time, is deenergized to release the shutter for closing movement. In order to assure proper starting conditions, it is desirable for the shutter operating mechanism to hold the armature of the electromagnet in engagement with the coil core mechanically with the electromagnet deenergized when the shutter is in cocked condition. When the shutter is released, the electromagnet is energized to retain the armature in engagement with the electromagnet and thereby retain the shutter operating mechanism in open condition until the shutter is to be closed to end the exposure. In order to minimize forces tending to separate the armature from the electromagnet, it is desirable to dissipate the energy of the driving member at the end of the opening movement so that it is not applied to the electromagnet. This makes it possible to use a smaller magnet and reduces the power requirements and hence the drain on the battery by which the magnet is energized.

The present invention provides an electrically controlled shutter having the desirable features set out above. It is hence capable of making high speed exposures, is reliable in its operation and requires only a small electromagnet with modest power requirements.

The nature and advantages of the shutter operating mechanism in accordance with the invention will be further understood from the following description of a preferred embodiment shown by way of example in the accompanying drawings in which.

Figure 1:
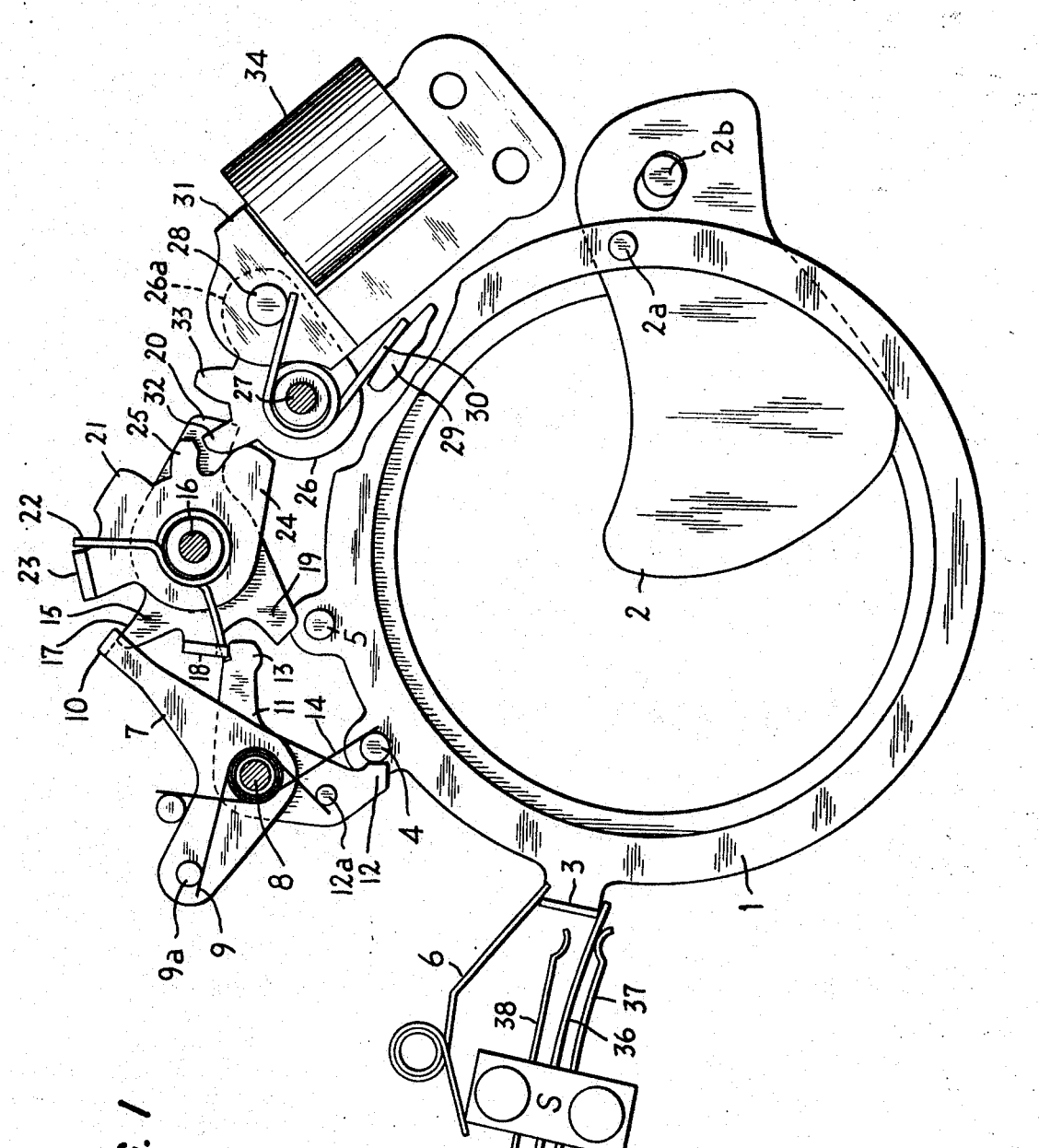
FIG. 1 is a schematic front view of operating mechanism in accordance with the present invention shown in cocked position.

The shutter operating mechanism shown by way of example in the drawings comprises a shutter ring 1 which is supported for rotation about the optical axis of the camera. The shutter ring is pivotally connected by a pin 2a to each of a plurality of shutter blades 2 arranged to pivot about pins 2b, only one shutter blade being shown in order to simplify the drawing. The shutter blades are opened by movement of the shutter ring 1 in a clockwise direction from the position shown in FIG. 1 to that shown in FIG. 2 and are closed by rotation of the shutter ring in a counterclockwise direction from the position shown in FIG. 2 to that shown in FIG. 1. The shutter ring 1 is provided with a switch operating projection 3, an opening pin 4 and a closing pin 5 and is biased in a counterclockwise direction to shutter closing position by a weak spring 6 acting on the switch operating projection 3.

A release lever 7 which is pivotally supported by a shaft 8 is biased in a clockwise direction by a spring 9 engaging a pin 9a on one arm of the lever while a downturned detent portion 10 is provided on a second arm. An opening lever 11, which is rotatably supported on the shaft 8 coaxially with the release lever 7, is provided at one end with a projection 12 engageable with the opening pin 4 of the shutter ring 1 and at the other end with a projection 13. The opening lever 11 is biased in a counterclockwise direction by a spring 14, one end of which engages the opening pin 4 of the shutter ring while the other engages a pin 12a on the opening lever so as to hold the projection 12 in engagement with the opening pin 4.

The shutter operating mechanism further comprises a first driving member 15, a second driving member 21 and a third driving member 26. The first driving member 15 is rotatably supported by a shaft 16 and is provided with an arm 17 engageable by the detent portion 10 of the release lever 7, a turned up projection portion 18, an opening driving arm 19 and a closing driving arm 20. The second driving member 21 is rotatably supported by the shaft 16 coaxially with the first driving member and is provided with a turned up projection portion 23 and a modified type gear portion composed of projecting gear teeth 24 and 25 of a particular shape as shown. The first and second driving members are coupled by a first driving spring 22, one end of which bears on the projection 18 of the first driving member 15 while the other end bears on the projection 23 of the second driving member 21 in a direction to press the projections 18 and 23 toward one another and thereby bias the first driving member 15 in a clockwise direction and the second driving member 21 in a counterclockwise direction from the positions shown in FIG. 1.

The third driving member 26 is rotatably supported by a shaft 27 and has an arm 26a on which the armature 31 of an electromagnet 34 is pivotally mounted by a shaft 28. The electromagnet 34 is controlled by the circuit shown in FIG. 4 as described below. A second driving spring 30 acting between the shaft 28 and a fixed part 29 biases the third driving member in a counterclockwise direction so as to move the armature 31 away from the electromagnet 34. On the periphery of the third driving member 26 there is provided a gear portion comprising modified gear teeth 32 and 33 cooperating with the teeth 24 and 25 of the second driving member 21. In the cocked position of the shutter as shown in FIG. 1, the tooth 32 of the third driving member is between the teeth 24 and 25 of the second driving member so that by reason of the bias of the second driving member in a counterclockwise direction by the first driving spring 22 the tooth 24 of the second driving member engages the tooth 32 of the third driving member so as to exert a force tending to rotate the third driving member in a clockwise direction and thereby press the armature 31 into contact with the electromagnet 34 and energize the second driving spring 30.

Figure 2:
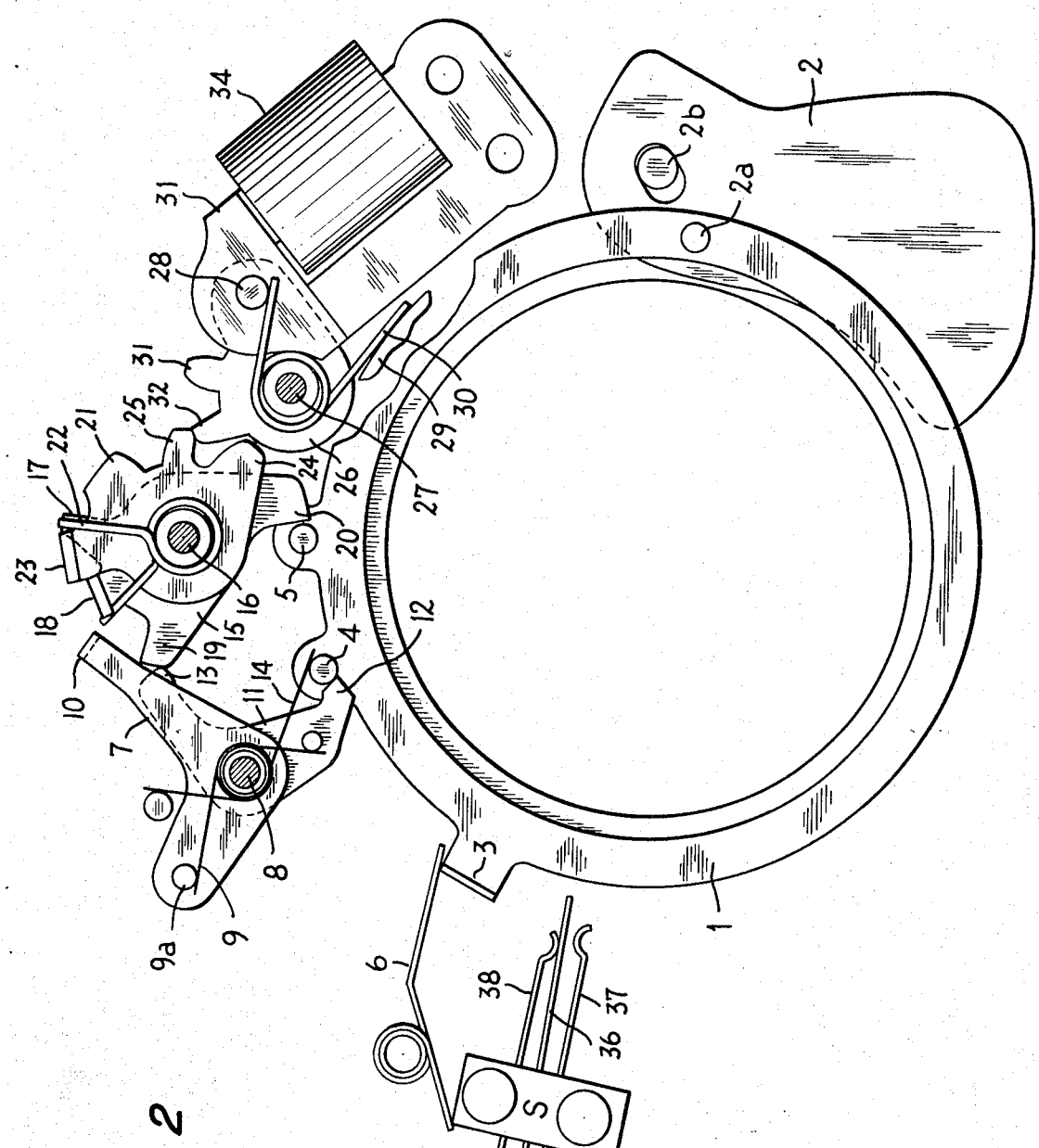
FIG. 2 is a similar view showing the mechanism in the condition when the shutter is opened.
Figure 4:
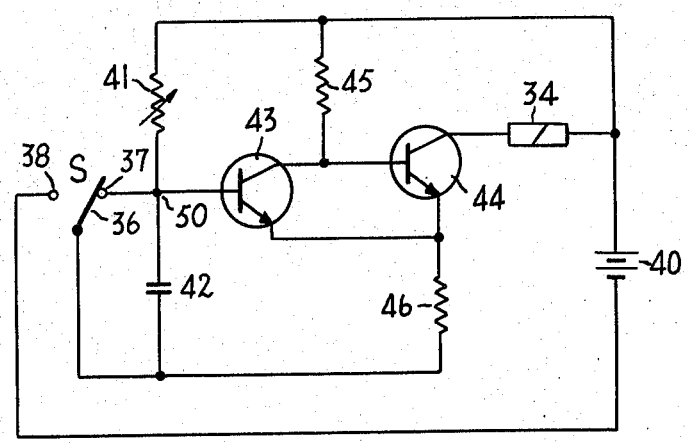
FIG. 4 is a schematic diagram of an electrical control circuit for the shutter operating mechanism.

As illustrated by way of example in FIG. 4, the control circuit of the electromagnet 34 comprises an electric source 40, for example a battery, and switching and timing circuitry including a switch S actuated by the shutter ring 1. The switch S comprises a movable spring contact 36 between contacts 37 and 38. When the shutter is in closed condition as illustrated in FIG. 1, the switch projection 3 on the shutter ring 1 engages the spring contact 36 to hold it in engagement with contact 37. When the shutter ring rotates in a clockwise direction from closed position as shown in FIG. 2, the spring contact 36 is disengaged by the switch actuating projection 3 and by its resiliency engages contact 38. The circuit further includes a photoconductive element or variable resistance 41 and a condenser 42 which are connected in series across the electric source 40 when the contact 36 of the switch S is in engagement with the contact 38. When the contact 36 comes into contact with the contact 37, the switch S opens the electric source circuit and short circuits the condenser 42 so that the condenser is in discharged condition. The junction point 50 between the resistance 41, condenser 42 and switch contact 37 is connected to the base of a transistor 43 on the input side of a switching circuit. The collector of the transistor 43 is connected to the base of an output transistor 44 as well as with the positive side of the electric source through a resistance 45. The collector of the transistor 44 is connected with one terminal of the coil of the electromagnet 34, the other terminal of which is connected to the positive side of the electric source 40. The emitters of both transistors are connected through a resistance 46 and contacts 36–38 of the switch S to the negative side of the electric source. It will thus be seen that the transistors 43 and 44 with the connections shown in FIG. 4 comprise a Schmitt circuit but other suitable switching circuit may be used.

The operation of the shutter operating mechanism illustrated in the drawings will now be explained. With the shutter in cocked position as shown in FIG. 1, the switch actuating projection of the shutter ring 1 which is biased in a counterclockwise direction by the spring 6 pushes the contact piece 36 of the switch S into engagement with the contact 37 thereby opening the circuit of the electric source 40 and short circuiting the condenser 42. The opening pin 4 of the shutter ring 1 and the actuating projection 12 of the opening lever 11 are pressed together by the spring 14 and the detent portion 10 of the release lever 7 engages the securing arm 17 of the first driving member 15 so as to hold the latter against clockwise rotation by the first driving spring 22. The projecting tooth 24 of the second driving member 21, which is biased in a counterclockwise direction by the spring 22, engages the tooth 32 of the third driving member 26 to transmit a clockwise rotational force to the third driving member and thereby energize the second driving spring 30 and hold the armature 31 in contact with the electromagnet 34 in its demagnetized state.

In this state, if a releasing operation is performed by rotating the release lever 7 in a counterclockwise direction against the bias of the spring 9, the detent 10 is disengaged from the securing arm 17 of the first driving member 15 which thereupon begins to rotate in a clockwise direction under the force of the spring 22. Upon clockwise rotation of the first driving member 15, the opening driving arm 19 engages the projection 13 of the opening lever 11 so as to rotate the opening lever in a counterclockwise direction. The projection 12 of the opening lever thereupon pushes the opening pin 4 toward the right as viewed in FIG. 1 so as to rotate the shutter ring 1 in a clockwise direction against the force of the spring 6. Upon clockwise rotation of the shutter ring 1, the actuating projection 3 moves away from the spring contact 36 of the switch S which thereupon by its resilience changes over from the contact 37 to the contact 38. This closes the circuit of the electric source 40 (FIG. 4) so that the condenser 42— which is no longer shorted—begins to be charged by a current flowing through the photoconductive or variable resistance element 41. Moreover, the coil of the electromagnet 34 is energized by current flowing through the output transistor 44, which is conductive, so that the electromagnet 34 attracts the armature 31 and thereby holds the third driving member 26 in the position shown in FIGS. 1 and 2 against the bias of the spring 30.

Rotation of the shutter ring 1 in a clockwise direction by the first driving member 15 acting through the opening lever 11 opens the shutter blades 2. As the end of the opening movement is reached, the opening driving arm 19 of the first driving member 15 rides over the end of the projection 13 of the opening lever 11 and the turned-up projection 18 of the first driving member engages the projection 23 of the second driving member 21 as illustrated in FIG. 2. As the driving force of the first driving spring 22 is considerably decreased in the opening movement, only the residual stored force is present in the collision of the projection 18 with the projection 23 so that the impulse given to the second driving member in a clockwise direction is moderate. Moreover, clockwise rotation of the second driving part is opposed by engagement of the gear tooth 25 with the gear tooth 32 of the third driving member 26. As seen in FIG. 2 the gear teeth are of such shape that tooth 25 of the second driving member 21 engages an end portion of the tooth 32 of the third driving member 26 in such manner that the force transmitted is approximately radial to the third driving member. Hence, any residual energy of the first driving member is dissipated by the force which acts approximately radially on the third driving member and hence does not rotate the third driving member in a direction to separate the armature 31 from the electromagnet 34. Consequently, it is possible to minimize the size and capacity of the electromagnet 34 and the power required by the electromagnet. Upon conclusion of the opening movement, the parts are in the position shown in FIG. 2 and the electromagnet 34 is energized by current flowing through the output transistor 44 as described.

Figure 3:
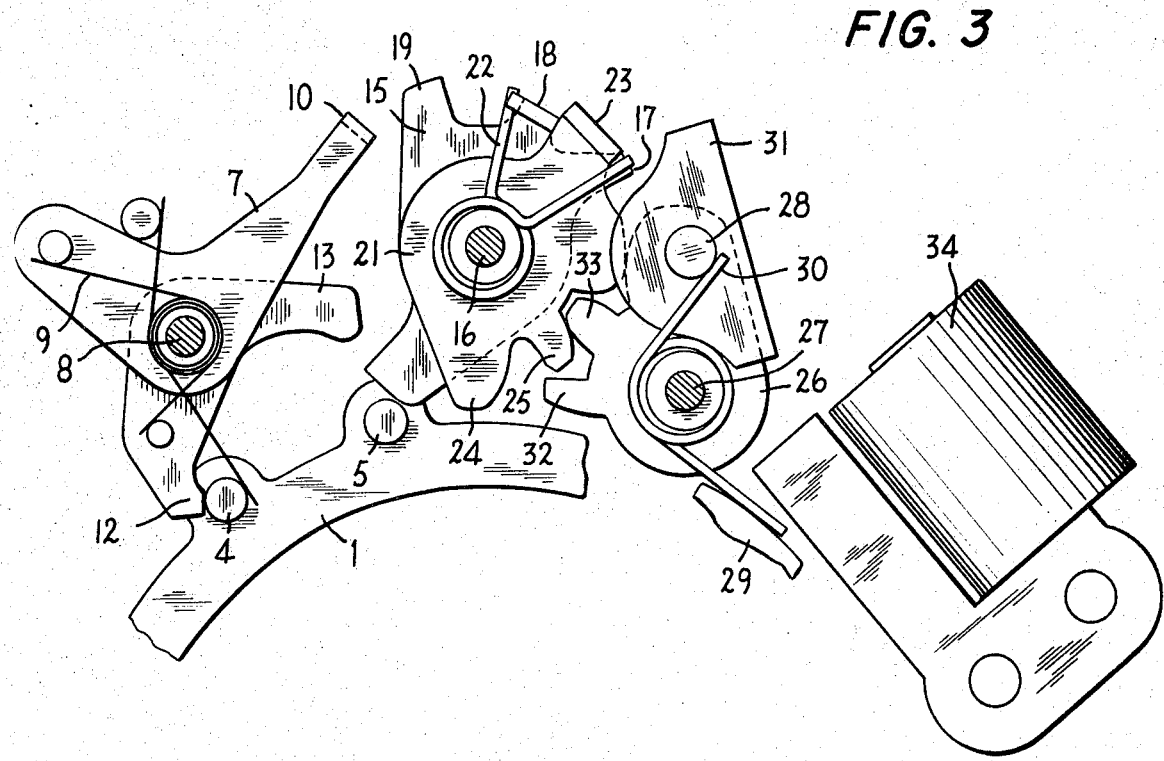
FIG. 3 is a partial view when the shutter is completely closed.

When the condenser 42 has been charged to a predetermined voltage by current flowing through the resistance 41, the increased voltage applied to the base of the transistor 43 causes that transistor to become conductive whereupon the output transistor 44 becomes nonconductive and cuts off the energizing current of the electromagnet 34. The armature 31 of the electromagnet is thereby released, permitting the third driving member 26 to be rotated in a counterclockwise direction by the second driving spring 30. The tooth 32 of the third driving member 26 thereupon pushes the tooth 24 of the second driving member 21 in a direction to rotate the second driving member in a clockwise driection. Since the first driving member 15 is coupled to the second driving member 21 by the first driving spring 22, the first driving member 15 is rotated clockwise and hence, in the same direction as in the opening movement of the shutter. The closing driving arm 20 of the first driving member 15 engages the closing pin 5 of the shutter ring 1 and pushes the pin 5 toward the left as viewed in FIG. 2 so as to rotate the shutter ring 1 in a counterclockwise direction and thereby close the shutter. The position of the parts when the shutter is thus closed is illustrated in FIG. 3. In this position the projection 3 of the shutter ring 1 engages the contact 36 of the switch S (not shown in FIG. 3) so as to disengage the contact 36 from the contact 38 and bring it into engagement with the contact 37 so as to open the electric source circuit and short circuit the condenser 42.

In order to recock the shutter mechanism, the first driving part 15 is rotated in a counterclockwise direction from the position shown in FIG. 3 to the position shown in FIG. 1 whereupon it is latched in cocked position by engagement of the detent 10 with the arm 17. During this recocking movement, the shutter ring 1 remains in the position shown in FIGS. 1 and 3 so that the shutter remains closed, the electric source circuit remains open and the condenser 42 remains short circuited. The parts are thereby brought to the cocked position shown in FIG. 1 so as to be ready for a subsequent exposure.

With the construction shown and described, it will be seen that since the first driving member rotates in the same direction, both to open the shutter and to close the shutter, inertia effects are reduced and a high speed exposure can be obtained. Since the armature carried by the third driving member is mechanically pressed against the electromagnet by the second driving member acting through modified gear teeth on the third driving member when the parts are in cocked position, initial engagement of the armature with the electromagnet is assured even though the electromagnet at this time is not energized. By thus assuring that the armature is in engagement with the electromagnet when the electromagnet is first energized at the start of the opening movement of the shutter, uniform exposure control and high accuracy are obtained. Moreover, since the energy of the shutter opening mechanism is dissipated in such manner that it does not act in a direction to separate the armature from the electromagnet at the end of the opening movement, it is possible to reduce the size and capacity of the electromagnet 34 and to minimize the consumption of electric power by the electromagnet so as to decrease the size and capacity of the battery required.

While a preferred embodiment of the invention has been illustrated in the drawings and is herein particularly described, it will be understood that modifications may be made and that the invention is in no way limited to the illustrated embodiment.

What I claim and desire to secure by Letters Patent is:

1. An operating mechanism for a shutter, comprising shutter actuating means, a first rotatable driving member acting on said actuating means to open and close the shutter, a second rotatable driving member having a gear portion, first spring means coupling said first and second driving members and acting on said first driving member when in cocked position in a direction to open the shutter, a third rotatable driving member having a gear portion interengaging said gear portion of the second driving member, second spring means for biasing said third driving member in a direction, electromagnetic means for releasably holding said third driving member against the bias of said second spring means, detent means for releasably holding said first driving member in a cocked position, and timing circuit means for energizing said electromagnetic means, said first driving member being movable by said first spring means upon release by said detent means in a direction to open the shutter, and said third driving member being movable by said second spring means upon release by said electromagnetic means to rotate said second driving member through said interengaging gear parts and thereby rotate said first driving member through said coupling, first spring means further in the same direction to close the shutter.

2. Shutter operating mechanism according to claim 1, in which said first and second driving members are coaxial.

3. Shutter operating mechanism according to claim 2, in which said shutter actuating means comprises a shutter ring rotatable in one direction to open the shutter and rotatable in the opposite direction to close the shutter and having an opening pin on said ring, and a pivoted opening lever having an arm engageable with said pin and an arm engageable by said first driving member to rotate said opening lever and thereby move said shutter ring in a direction to open the shutter.

4. A shutter operating mechanism according to claim 3, in which a closing pin is provided on said shutter ring and in which said first driving member has an arm engageable with said opening lever to turn said opening lever in a direction to open the shutter and an arm engageable with said closing pin to turn said shutter ring in a direction to close the shutter.

5. A shutter operating mechanism according to claim 4, in which said arm of said first driving member engageable with said opening lever rides off of said lever and becomes disengaged therefrom when said shutter is opened.

6. Shutter operating mechanism according to claim 2, in which said first driving spring acts between raised projections on said first driving member and said second driving member respectively to urge said raised projections toward one another and thereby bias said first driving member and second driving member in opposite directions.

7. Shutter operating mechanism according to claim 6, in which said raised projection on the first driving member is engageable with said raised projection on the second driving member upon opening of the shutter, whereupon said first driving member by residual momentum applies a force in a direction to rotate said second driving member with said first driving member.

8. Shutter operating mechanism according to claim 7, in which said gear portion of said second driving member comprises a gear tooth which acts on a gear tooth of said third driving member in a direction to transmit a force to said third driving member in a direction approximately radial to said third driving member upon engagement of said raised projection of said first driving member with said raised projection of said second driving member, whereby residual energy of said first driving member is dissipated upon completion of opening of the shutter without imparting substantial torque to said third driving member.

9. Shutter operating mechanism according to claim 1, in which said electromagnetic means comprises a coil and an armature pivotally mounted on said third driving member, and in which said second driving member when in cocked position is biased by said first driving spring to transmit force through said gear portions to said third driving member to press said armature to said coil.

References Cited

UNITED STATES PATENTS

| | | | |
|---|---|---|---|
| 3,435,746 | 4/1969 | Pross | 95—63 X |
| 3,250,198 | 5/1966 | Spiessel | 96—63 |
| 3,448,672 | 6/1969 | Singer | 95—63 |

SAMUEL S. MATTHEWS, Primary Examiner

M. L. GELLNER, Assistant Examiner